United States Patent [19]

Bailey et al.

[11] Patent Number: 5,357,380
[45] Date of Patent: Oct. 18, 1994

[54] METHOD AND APPARATUS FOR INDICATING WHEN EACH TRACK IS IN BURST IN A MULTITRACK TAPE DEVICE

[75] Inventors: Charles E. Bailey; Steven R. Bentley; Sushama M. Paranjape; Fernando Quintana; Stephen C. West, all of Tucson, Ariz.

[73] Assignee: International Business Machines Corporation, Armonk, N.Y.

[21] Appl. No.: 77,477

[22] Filed: Jun. 14, 1993

[51] Int. Cl.⁵ .................... G11B 5/09; G11B 20/20
[52] U.S. Cl. ........................... 360/51; 360/26
[58] Field of Search ............ 360/51, 76, 137, 26, 360/55, 67; 318/6; 340/146.1; 364/900; 371/1, 13; 379/59; 455/10

[56] References Cited

U.S. PATENT DOCUMENTS

| | | | |
|---|---|---|---|
| 3,641,534 | 2/1972 | Irwin | 360/51 |
| 3,702,996 | 11/1972 | Wolfer et al. | 360/51 X |
| 3,771,125 | 11/1973 | Nagahori et al. | 340/146.1 |
| 3,869,716 | 3/1975 | Blethen | 360/55 |
| 4,222,081 | 9/1980 | Kamo et al. | 360/67 |
| 4,342,057 | 7/1982 | LaBeau et al. | 360/76 |
| 4,357,702 | 11/1982 | Chase et al. | 371/1 |
| 4,389,600 | 6/1983 | Milligan et al. | 318/6 |
| 4,506,309 | 3/1985 | Joannou et al. | 360/137 |
| 4,654,867 | 3/1987 | Labedz et al. | 379/59 |
| 4,783,784 | 11/1988 | Ishiguro et al. | 371/13 |
| 4,932,070 | 6/1990 | Waters et al. | 455/10 |
| 4,974,189 | 11/1990 | Russon et al. | 364/900 |

Primary Examiner—John Shepperd
Assistant Examiner—Patrick Wamsley
Attorney, Agent, or Firm—F. E. Anderson; M. W. Schecter

[57] ABSTRACT

A method and apparatus which first calculates track to track skew in a tape device and then uses the results of that calculation to adjust the windows for detection of sync and resync characters. The system makes use of global circuitry which adjusts the sync and resync windows for all tracks based upon the skew calculation. In the case of the windows used for detecting resyncs, when skew is determined to be large, the global resync window must span a larger time period to account for the skew in detecting resync marks. Conversely, when there is little or no skew present, the windows for resync detection can be narrowed. Normally, the track logic utilizes its own local windows to detect resyncs. If a track misses a resync, however, it must use the global resync window to determined the next resync location. Once the tracks are resynchronized, control can return to local track circuitry to maintain synchronization. In the case of force windows used for detecting the syncs after a resync alignment burst, the skew calculation is used to determine the correct sync location for each particular track. Further, data alignment is maintained in the multitrack environment through the use of a deinterleaving circuit which receives misalignment indications and, in response, makes address corrections to data bytes and pointer bytes.

6 Claims, 7 Drawing Sheets

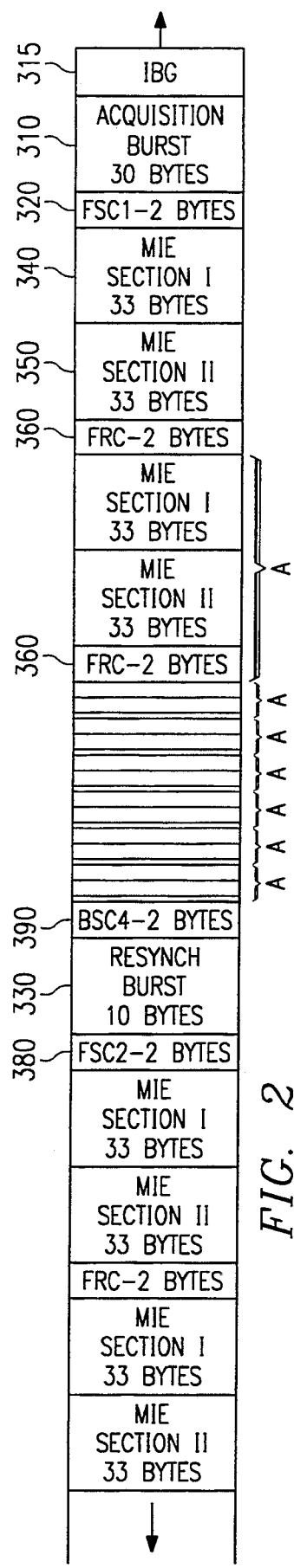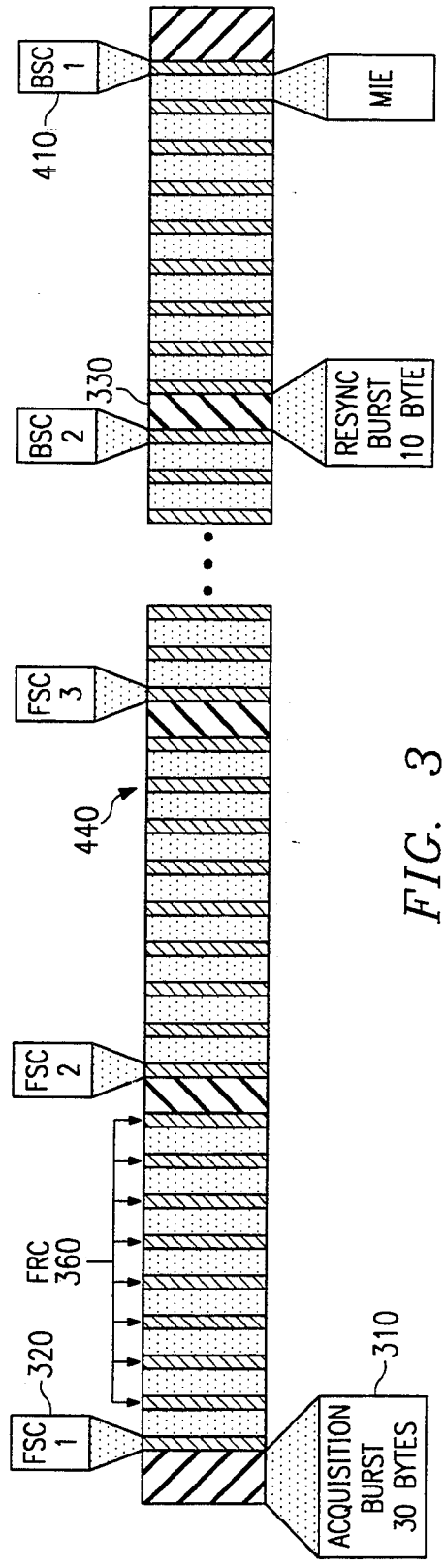
FIG. 2
FIG. 3

METHOD AND APPARATUS FOR INDICATING WHEN EACH TRACK IS IN BURST IN A MULTITRACK TAPE DEVICE

BACKGROUND OF THE INVENTION

1. Field of the Invention

The present invention relates in general to tape storage devices and in particular to a method and apparatus for detecting and managing skew in a multitrack environment.

2. Description of the Prior Art

Multitrack tape recording involves the writing and reading of data on more than one track simultaneously. In the data processing industry, tape devices used as secondary storage, operate almost exclusively in the multitrack environment. While multitrack recording and reading provides a high data transfer rate, it is not without its disadvantages. These disadvantages are heightened by high tape speeds, high tape capacities and decreasing thickness of tapes used in current tape drives.

When high density data recording in a multitrack environment is performed, severe edge track to edge track skew can result. This skew can hinder or even prevent the recovery of data stored on the tape. Skew is caused by several factors inherent in the tape drive environment. First, in multitrack tape drives it is necessary to align the multiple head elements with each of the data tracks on the medium. This physical alignment must typically be repeated periodically to ensure consistent and accurate operation. The problem with head adjustment, however, is that it can introduce skew. By adjusting the head to line up with each of the tracks on the tape medium, a resultant skew between tracks can occur.

Skew is similarly introduced by such factors as a large separation between the concurrent tracks, the use of a flexible tape medium, and variations in physical tolerances between the head elements and the particular seating of the tape cartridge within the drive. Finally, the high linear density in modern tape formats magnifies all of these factors to further increase the magnitude of the skew. Interchange (where a tape is written on one drive and read on another) can, and often does, aggravate the problems associated with tape skew.

Skew is manifested, on the average, as a uniformly sloped misalignment of data as they are read from tape. The effects of skew prevent normal track voting and hinder the ability to reacquire synchronization of lost tracks. When reading the block, at initial acquisition, the uncertainty in the magnitude, profile and slope of the skew makes acquisition of the block difficult.

Further, multitrack implementations present the additional requirement of consistent track alignment in order to correctly process the data through the Error Correction Code (ECC) circuitry. During a read operation, pointers are used to improve the correction power of the ECC decoder. These pointers and the ECC block must be aligned correctly if the correction power of the ECC block is to be maximized.

SUMMARY OF THE INVENTION

Accordingly, it is an object of the present invention to provide a method for accurately determining the amount of skew in a tape device.

It is another object of this invention to minimize the effects of skew in a tape device.

It is a further object of this invention to adjust the method for performing synchronization and resynchronization of tracks based upon the amount of skew determined to be present in the system.

It is a still further object of this invention to maximize ECC correction power by providing consistent alignment between pointers and the ECC blocks.

According to the invention, these objects are accomplished by a method and apparatus which first calculates track to track skew in a tape device and then uses the results of that calculation to adjust the windows for detection of sync and resync characters. The system makes use of global circuitry which adjusts the sync and resync windows for all tracks based upon the skew calculation. In the case of the windows used for detecting resync marks, when skew is determined to be large, the global resync window must span a larger time period to account for the skew in detecting the sync and resync marks. Conversely, when there is little or no skew present, the windows for resync detection can be narrowed. Normally, the track logic utilizes its own local windows to detect resync marks. If a track misses a resync mark, however, it must use the global resync window to determine the next resync location. Once the tracks are resynchronized, control can return to local track circuitry to maintain synchronization. In the case of force windows used for detecting the syncs after a resync alignment burst, the skew calculation is used to determine the correct sync location for each particular track. Further, data alignment is maintained in the multitrack environment through the use of a deinterleaving circuit which receives misalignment indications and, in response, makes address corrections to data bytes and pointer bytes.

BRIEF DESCRIPTION OF THE DRAWINGS

The above and further objects, features and advantages of the present invention will become more apparent from the following detailed description taken in conjunction with the accompanying drawings, wherein:

FIG. 2 is a representation of a portion of magnetic tape illustrating, in conjunction with the text, the preferred tape format used with the invention;

FIG. 3 is a representation of a portion of magnetic tape showing a complete physical block according to the preferred tape format used with the invention;

DESCRIPTION OF THE PREFERRED EMBODIMENT OF THE INVENTION

Figure 1:
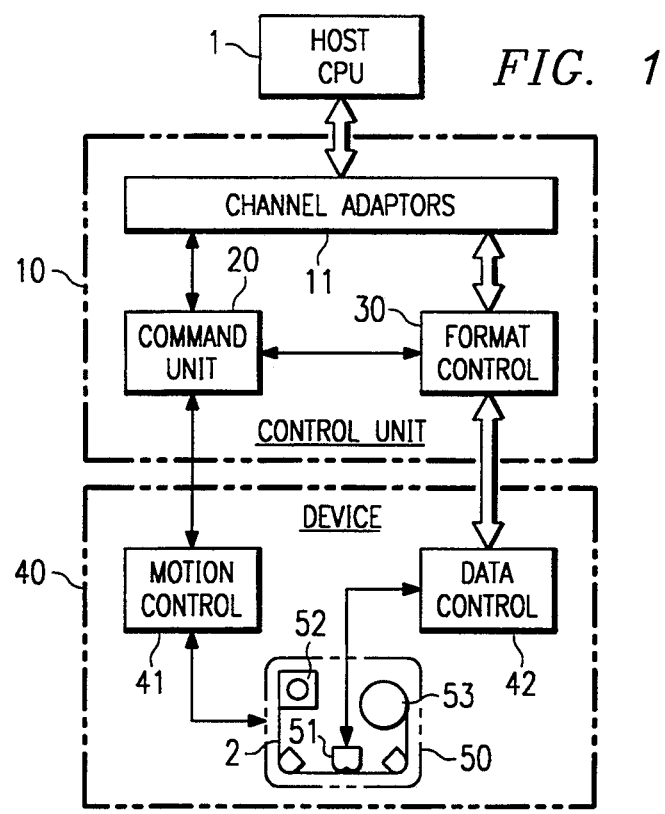
FIG. 1 is a schematic block diagram of a tape system embodying the invention.

Referring more particularly to the drawings, like numerals denote like features and structural elements in the various figures. The invention will be described as embodied in a magnetic tape drive for use in a data processing environment. Turning now to FIG. 1, a data processing system is controlled by at least one host central processing unit (CPU) 1 to store, retrieve, and manipulate data. The data processing system includes one or more tape systems. In the preferred embodiment, at least one of these tape systems is an IBM tape drive to be announced which uses a pre-defined data format described below.

The tape system further includes at least one control unit 10 and at least one magnetic tape recording or playback device 40. The control unit 10 accepts commands and data from the CPU 1 via one or more channel adapters 11, and controls the device(s) 40 accordingly.

The device 40 includes a motion control 41 for controlling the motion of the magnetic tape medium 2, a data control 42 including read and write circuits to operate a magnetic transducing head 51, and a tape path 50 (including a tape cartridge 52 having a tape supply reel therein and a tape take-up reel 53) for transporting the magnetic tape medium 2 past head 51 for writing data to and reading data from tape 2. The data control 42 is coupled to a format control 30 in control unit 10, which is in turn coupled to channel adapters 11.

The motion control 41 is coupled to a command unit 20 in the control unit 10, which is also coupled to channel adapters 11. The command unit 20 accepts commands from the CPU 1 via channel adapters 11 and controls the mechanical operation of device 40. The command unit 20 further controls the flow of data between the channel adapters 11 and tape 2 via format control 30 and data control 42.

The invention described herein is preferably embodied in an IBM tape drive to be announced in the near future although it could be similarly employed in a number of existing and/or future tape drives. This tape drive employs a particular format for tape reading and writing which is now described. The format definition allows for recording and data retrieval in two separate formats. The first format records (and reads) on a total of 128 tracks and the second format records (and reads) on a total of 256 tracks. The term "tracks" refers to the individual regions down the length of the tape in which information is magnetically recorded.

The full complement of tracks (either 128 or 256) is NOT read (or written) simultaneously. Instead, the totality of tracks is broken down into groups which can be read (or written) simultaneously by the single multi-element read head (write head). In the preferred embodiment of this invention, when the 128 track format is selected, this group size is 16. Thus, there are 8 groups of 16 tracks, each group being read or written individually. In the 256 track format, the group size is 32 resulting in 8 groups of 32 tracks with each group being read or written individually.

It can thus be seen that to completely access data on a given tape cartridge, multiple passes are necessary. When reading or writing data in either format the tape direction alternates between each pass so that for sequential processing there is no significant tape repositioning necessary during the required transitions between passes.

The tape format of the preferred embodiment has a number of physical block entities, the description of which is required for an understanding of the invention herein. The following description is best understood with reference to FIG. 2 which shows a portion of one physical block residing on the tape medium formatted in accordance with the preferred embodiment of this invention. The physical block entities described below, as well as others are actually written on the physical tape medium. They are created by various processes which transform device blocks (host data broken into manageable sized blocks) into physical blocks which may be recorded on the tape medium.

An acquisition burst 310 is located immediately following the Interblock Gap (IBG) 315 separating two physical blocks. The acquisition burst 310 is a string of thirty bytes which is used to acquire bit synchronization of the read clock to the data at the beginning of a physical block. Acquisition bursts also occur at the end of each physical block prior to the next IBG, to support read backward and detection of the IBGs. These acquisition bursts are called trailing acquisition bursts. The acquisition burst 310 used in the preferred embodiment of this invention is a repeating sequence: "010101010101 . . .".

Another physical block entity associated with the acquisition burst 310 is the resynchronization burst (resync burst) 330. Resync bursts are ten bytes long and are also used to acquire bit synchronization of the read clock to the data. Resync bursts are constructed of the same bit sequence as the related acquisition burst 310 described above (e.g. "010101010101 . . ."). Resync bursts occur regularly within the physical block structure and are always preceded and followed by a sync character (described below). The data located between respective resync bursts is defined as a resync burst interval. Resync burst 330 and others like it are designed to allow the individual track read clocks to reacquire bit synchronization within a physical block. Since they are designed to allow individual tracks to resynchronize, there is no requirement that all tracks contain resync information at the same physical location on tape. As a result, and because track to track skew is not a consideration, the resync burst 330 can be shorter than a corresponding acquisition burst 310 and still perform its desired function.

A third physical block entity important to an understanding of the invention herein, is termed a synchronization (sync) character. These sync characters are best described with reference to FIG. 3 which shows a full physical block of tape. There are a number of sync characters which are used to acquire byte synchronization if bit synchronization is already acquired. Various sync characters occur regularly within the physical block structure. Sync characters are placed after the acquisition burst 310 (FSC1 320), before the trailing acquisition burst (BSC1 410) and on both sides of the resync bursts internal to the physical block (e.g. FSC2, FSC3).

There are 12 different sync characters defined for the preferred format. Five are forward sync characters (FSC), five are backward sync characters (BSC), one is the forward resync character (FRC) and one is the backward resync character (BRC). The forward and backward sync characters are defined to support the ability to read and write data in both the forward and reverse directions. The five forward and five backward sync characters are placed at the beginning and end of the physical block, respectively. They are unique and provide information to device 40 on how close the beginning or end of the physical block is to the read head.

When information is read from the medium, reading may begin as soon as the read clock is frequency locked to the information on tape. This occurs in the acquisition burst 310. Within the IBG 315, the clocks of all concurrently read tracks are out of synchronization and/or alignment. Bit synchronization is normally achieved in all tracks when the first acquisition burst is encountered at the beginning of the physical block. Byte synchronization is normally achieved in all tracks when the first sync character is encountered (FSC1 320 in the forward direction and BSC1 410 in the reverse direction) following the initial acquisition burst 310. Alignment of data for transmission to the CPU 1 is achieved by noting the order in which the concurrently read tracks encounter FSC1 320.

Synchronization may be lost following the proper reading of a complete physical block and before reading the next physical block. This is particularly true if an append write operation previously occurred. With an append write, the actual writing begins in the middle of a previously written IBG. This causes a discontinuity when the read head passes the point where the append write operation began rewriting the IBG and thus synchronization is easily lost. Synchronization is reacquired, however, during the acquisition burst at the start of the next physical block.

Figure 4:
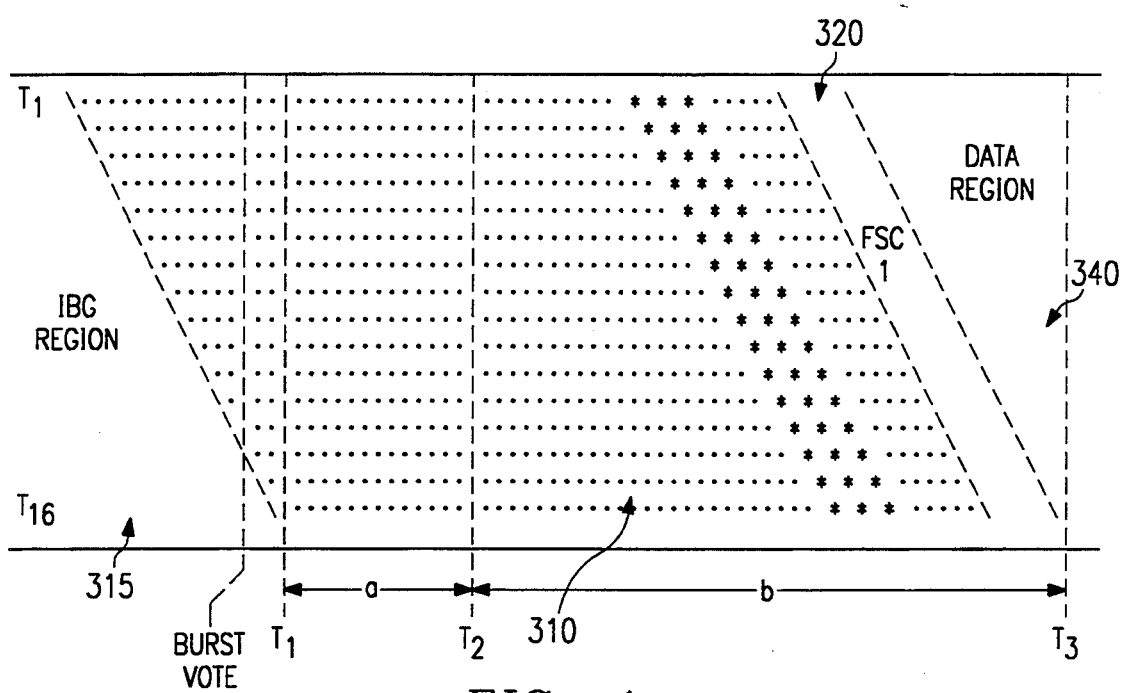
FIG. 4 is a cutaway view showing the region of magnetic tape proximate to and including the acquisition burst at the bit level.

Turning now to FIG. 4, the particular feature of this invention providing skew calculation is discussed. FIG. 4 shows a portion of magnetic tape which is skewed relative to the read head. The dotted region represents acquisition burst 310, which logically corresponds to the beginning of the physical block. To the left (logically backward on tape) is IBG region 315. Immediately past the acquisition burst 310 is forward sync character 1 (FSC1) 320. A data region 340 follows FSC1 320.

The following discussion assumes a read operation in the logically forward direction. It should be noted, however, that the same procedure would apply in reverse if the read was occurring in the logically backward direction. During a read in the forward direction, the IBG region 315 of the tape will pass over the read head. At this time, since the individual read clocks may not be synchronized with the data on their corresponding tracks, it is necessary to reacquire synchronization of the data on the bit boundary. Furthermore, since at the time the IBG 315 is passed over the read head, the global clock may not be synchronized, it will be necessary to reacquire synchronization on a byte boundary.

The acquisition burst 310 is designed to allow the read clocks for all concurrently read tracks to simultaneously acquire bit synchronization to the data. Because the acquisition burst is of limited length, it is imperative to know, as soon as possible, when all tracks are in burst, so that global clock acquisition can be performed. It is also necessary to know when all tracks are in burst as soon as possible so that other timeouts can be started properly. If the skew is so great that there is never a time when all tracks are in burst simultaneously during the acquisition burst 310 window, neither global clock acquisition nor bit synchronization can occur.

It can be seen that the presence of skew could cause some tracks to lag for quite a while. It should be noted, however, that the format of the preferred embodiment employs an acquisition burst length of 30 bytes which is designed to allow all tracks to be in burst simultaneously in the worst case skew. Thus, even with a significant amount of skew, the system is designed to insure that there is at least some minimum time during which all tracks are in burst. In the preferred embodiment of the invention, all tracks are required to be in burst concurrently for at least 40 bits to allow global clock lock.

As a result, it can be seen that the ideal operation is to place all tracks in acquisition mode as soon as the last track goes into burst. Since any number of tracks can fail to detect burst, it is difficult to determine the exact moment when all tracks will be guaranteed to be in burst. The operation of this invention uses an extrapolation technique to accurately locate that moment so that timeouts can be started and the system placed in acquisition mode.

By making use of a given maximum skew of 220 bits in the preferred embodiment, the global clock circuitry can generate timeouts that manage clock acquisition within a fixed window. The 220 bit value can easily be adjusted and reprogrammed based upon the amount of skew believed to be possible in the system. It is assumed with this value that one track will never be ahead of or behind any other track by more than 220 bits. The global clock circuitry assumes that the skew is uniformly sloped and that it has the specified maximum value. At the time of a successful burst vote, it multiplies the programmed maximum skew value by the number of tracks that have not as yet acquired burst. With this in mind, the time that all tracks will be in burst can be determined.

Figure 5:
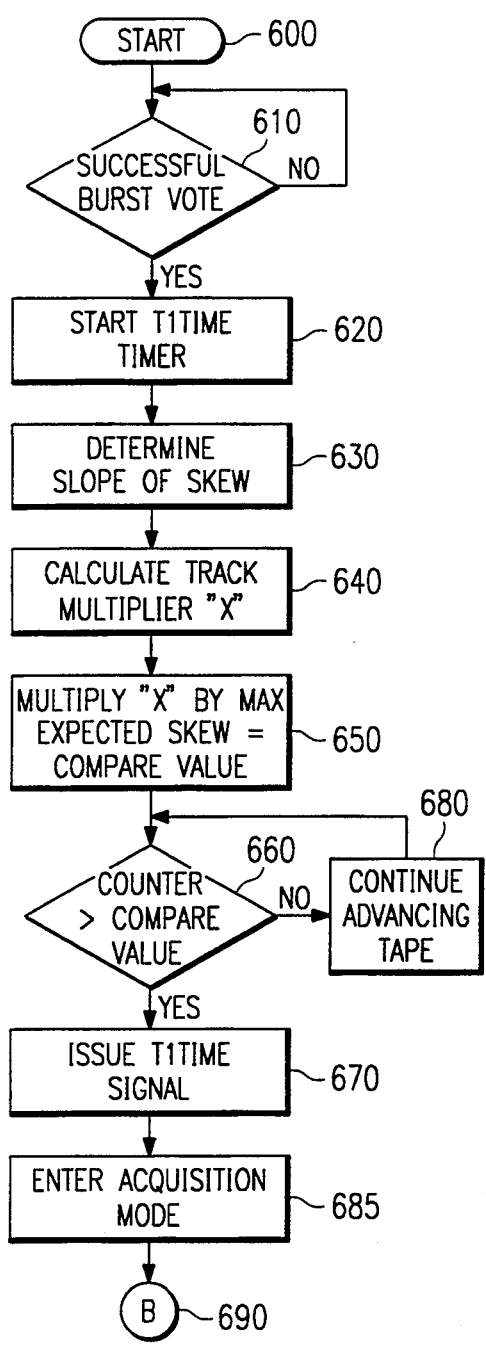
FIG. 5 is a flowchart illustrating the method of this invention for determining when all tracks on the tape medium will be in burst.
Figure 6:
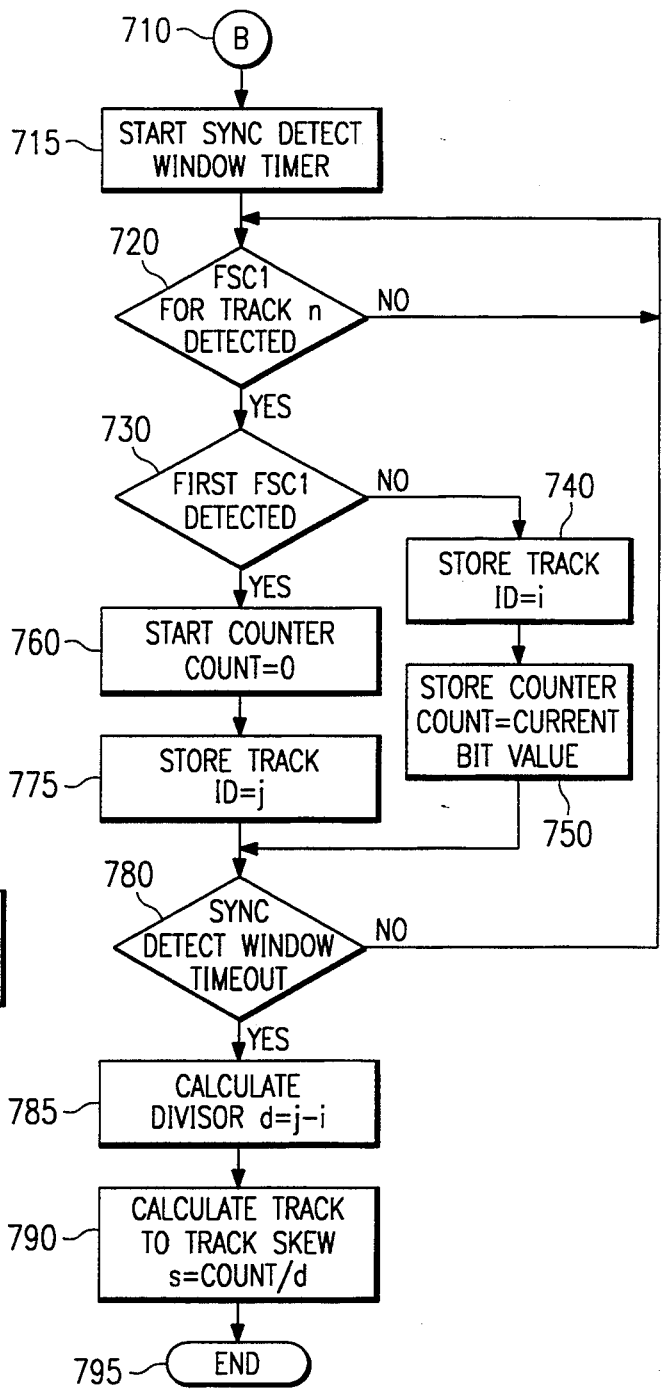
FIG. 6 is a flowchart illustrating the method of this invention for determining the amount of skew present in the tape system.

Referring now to the flowcharts of FIGS. 5 and 6, the specific process for determining skew is described. FIG. 5 specifically illustrates the portion of the method wherein the earliest time when all tracks will be in burst is determined. The circuit captures the burst indications as they arrive from the tracks at step 610. A burst vote occurs with respect to all tracks and is considered successful when ¾ of the tracks achieve burst. In the preferred embodiment using 16 concurrent tracks, this requires 12 tracks to be in burst. It can be seen in FIG. 4 that when the burst vote is taken, 13 of the 16 tracks are in burst. It should be noted that while each dot in FIG. 4 represents a bit, in reality there would be 360 bits before the FSC1 320 region is reached. Thus, not all bits are shown in the figure.

Once the burst vote is achieved, the T1 timer is started immediately (step 620) and the circuit begins the calculation. The calculation circuit first determines the slope of the skew at step 630 by comparing the track IDs of the first and last tracks detecting burst at the time of the burst vote. The IDs of the tracks are binary values ranging from 1 to N and corresponding to tracks 1 to N which are concurrently read. In the case of the preferred embodiment, N=16. The slope of the skew can thus be determined. If the first track to detect burst is of a lower ID value than that of the last track to detect burst, then the slope is negative. Otherwise the slope is positive.

If the slope is determined to be positive, 1 is subtracted from the ID of the last track detecting burst to give the track multiplier (step 640). The value for the track multiplier is denoted "X" in FIG. 5. On the other hand, if the slope is determined to be negative, as is the case in the figure, then the ID of the last track detecting burst is subtracted from N (16). In this case, track 13 is the last track detecting burst and subtracting 13 from 16 gives 3 for the track multiplier. This value is multiplied at step 650 by the programmed number representing maximum track to track skew ever expected—15 in this case. The output of the multiplier provides a compare value which is compared with the counter timer previously started when the burst vote was initially achieved. When the counter exceeds the compare value, a signal is issued (time $T_1$) indicating that the latest track is in burst (step 670). If the burst vote is achieved and only one track appears to indicate burst detection, it is assumed that all track bursts occurred simultaneously and the $T_1$ signal is issued immediately.

The system is placed in acquisition mode at time $T_1$ and continues as represented in FIG. 4 through time period "a". During acquisition mode, the read clock frequencies are adjusted to the dataflow frequencies until they match so that data can be read from tape. Period "a" is, in the preferred embodiment, specified for a maximum period of 40 bits. This is the time required to guarantee that the read clocks are all synchronized to the dataflow frequency.

Because the initial skew value is based on the maximum track to track skew programmed in microcode, it is only as accurate as the programmed value. At the time that this calculation is done, the actual skew of the data on the tape is not known. Thus the actual skew must be calculated based upon the detection of the sync characters after the acquisition burst.

Beginning at time $T_2$, after period "a", the global circuits monitor the tracks for detection of the FSC1 sync character 320. The sync character FSC1 320 must be detected by a majority of tracks prior to timeout at time $T_3$. The window in which FSC1 320 must be detected is referred to herein as a "force window". The force window constraint is imposed in order to prevent the detection of false sync marks. In order to prevent downstream data from being interpreted as this sync character, there must be some limit on the amount of time or tape that is allowed to pass before it is assumed that the sync character is not present where it is supposed to be. Since the window for detecting FSC1 320 does not start until time $T_2$, it is important to issue this signal as soon as possible to increase the chances of detecting FSC1 320 within window "b".

The force window for FSC1 320 is necessarily determined by the point in time that signals $T_1$, $T_2$ and $T_3$ all occur. Thus, after the burst vote is achieved, the time for signal $T_1$ to occur can be calculated as described above. Next, signal $T_2$ is calculated to occur within the minimum clock acquisition time from the $T_1$ signal. This value is 40 bits in the preferred embodiment. The $T_3$ signal, which is triggered, in turn by the $T_2$ signal occurs a fixed time after the $T_2$ signal. This time value is programmed in the microcode as the optimum value providing the best tradeoff between avoiding false sync detection and increasing the likelihood of locating the desired sync character within the force window. As soon as the clock is acquired and at point $T_2$, a sync detect window timer is started (step 715 in FIG. 6). The timer times out at time $T_3$ as shown in FIG. 4. The sync detection window timer insures that the system will look for FSC1 320 for only a limited period of time. This limited period of time is initially determined by worst case skew since actual skew is unknown at the time.

Logic in the global circuits determines track to track skew in the following manner and as shown in FIG. 6. When the first sync character FSC1 320 is detected by one of the tracks (steps 720 and 730), a counter is started (step 760) and the ID of the track that detected the sync is stored in location j (step 775). When the next sync is detected by a second track (step 720), the ID of that track is stored in location i (step 740) and the value of the counter (representing the time delay between tracks detecting sync) is stored in location COUNT (step 750).

Sync detection continues until the next sync arrives at a third track (step 720). At this time, the ID of the third track detecting the FSC1 320 character overwrites the ID stored in location i and the new count (from the time of the first sync detection) overwrites the previously stored count in location COUNT. Operation continues in this manner until all of the syncs are detected or the $T_3$ timeout occurs (step 780). At this time, the IDs of the tracks detecting the first and the last syncs are stored and the count between the first and last sync detection times is stored.

The track to track skew, which is defined as the average distance between any two tracks, is calculated by dividing the stored count by the difference in track IDs between the first and the last tracks detected. The difference in track IDs between the first and last tracks is calculated as d with d=j−i (step 785). For example, if track 1 was the first track detected and track 12 was the last track detected, the divisor (d) is 11. (1100−0001=1011). COUNT is then divided by d to give track to track skew (step 790) The slope of the skew is determined by which track arrived first. Thus, if the track that arrived first has a numerically lower track ID than that of the last track, the slope is negative. Otherwise skew slope is determined to be positive.

Once the track to track skew is calculated, registers for each track are loaded with counts that represent the distance from the earliest track. This calculation is based upon the average skew calculated as well as the physical track to track distances required by the selected tape format. The values in these registers are later used to determine downstream force window locations as is described below. They will be referred to hereinafter as the track registers. There is one track register for each of the 16 tracks on the tape medium.

As the tape medium moves over the read (and write) head, the synchronization and/or alignment obtained at the acquisition burst at the beginning of the physical block can be lost. As can be seen in FIG. 2, forward 380 and backward 390 sync characters surrounding resync burst 330 occur downstream to allow byte synchronization of the read clock to the data. The time/tape length in which this synchronization occurs must be limited, as with the FSC1 sync character 320 to prevent false sync detection. As a result, "windows" must be opened and closed within which this downstream synchronization must occur. The location of these windows must be varied as a function of the previously calculated average track to track skew. The use of the calculated track to track skew in determining these downstream windows is now discussed.

For purposes of illustration, it will be assumed, as shown in FIG. 2, that the backward sync character (BSC) 390 is BSC4. This means that there are 3 BSC's downstream from BSC4 390. It is to be understood that the particular backward sync character at the first occurring resync burst would depend on the number of data (MIE) sections present in the physical block but that the following procedure would apply regardless of the particular BSC associated with the first resync burst 330.

When the device 40 detects a downstream resync burst (e.g. 330), a window is opened and a timeout started. This window/timeout is used by the tracks to locate and place a timing constraint on the detection of the sync mark (FSC2 380) after the resync burst 330. As mentioned above, the sync characters are used to reacquire synchronization on byte boundaries. Once BSC4 390 is detected by a track, a counter register is loaded with the value of the track register for that track and the window for that track is opened immediately. Thus, for example, if track 3 was the first track to detect BSC4 390 and track 3 was previously calculated to be skewed by 25 bits from the first track to detect acquisition burst (assume track 1), then the value 25 is stored in the counter location and the window for track 3 is opened immediately.

The count in the counter is compared at this time with the remaining track registers. If the count in the counter exceeds any of the values in the remaining track registers, then the window for the associated track is opened immediately. Continuing, as the timer count exceeds succeeding track registers, the windows for tracks associated with the registers are opened.

For each track, the window is closed when the counter exceeds the value of the track register plus the realignment burst length (ten bytes) plus a tolerance constant. This provides a track specific window in the resync burst region 330 that the tracks use to detect their individual sync marks (in this case FSC2 380) after the resync burst 330.

Track skew is recalculated after every resync burst since false syncs are less likely to occur there than in the data itself. The recalculation of skew at each realignment burst provides a dynamic skew adjustment as the tape is read. Thus, the current skew profile is always maintained.

The calculated track to track skew is further used by the circuitry that generates resync windows corresponding to the FRCs 360 located between resync bursts or between the acquisition burst 310 and the first resync burst. The tracks use these windows to resynchronize themselves between resync bursts. The tracks detect FRCs 360 using both a global and a local resync window. So long as a particular track is not "lost", the local window can be used. However, if the track misses a resync mark for any reason, the track must revert to the global resync window to reacquire synchronization. Once this is accomplished, the track can return to the local window.

The global resync window width must vary as a function of track to track skew. The global circuit uses a global average clock to run a counter that opens a window based on a fixed count between resyncs.

The window opens a distance "x" number of bits before the first track resync mark is expected to occur and stays open for 16 bits times the expected skew following the opening of the window. In addition, a small tolerance value is added prior to the actual closing of the window. This allows the global resync window to span the region where all of the track resync marks are expected to occur.

Figure 7:
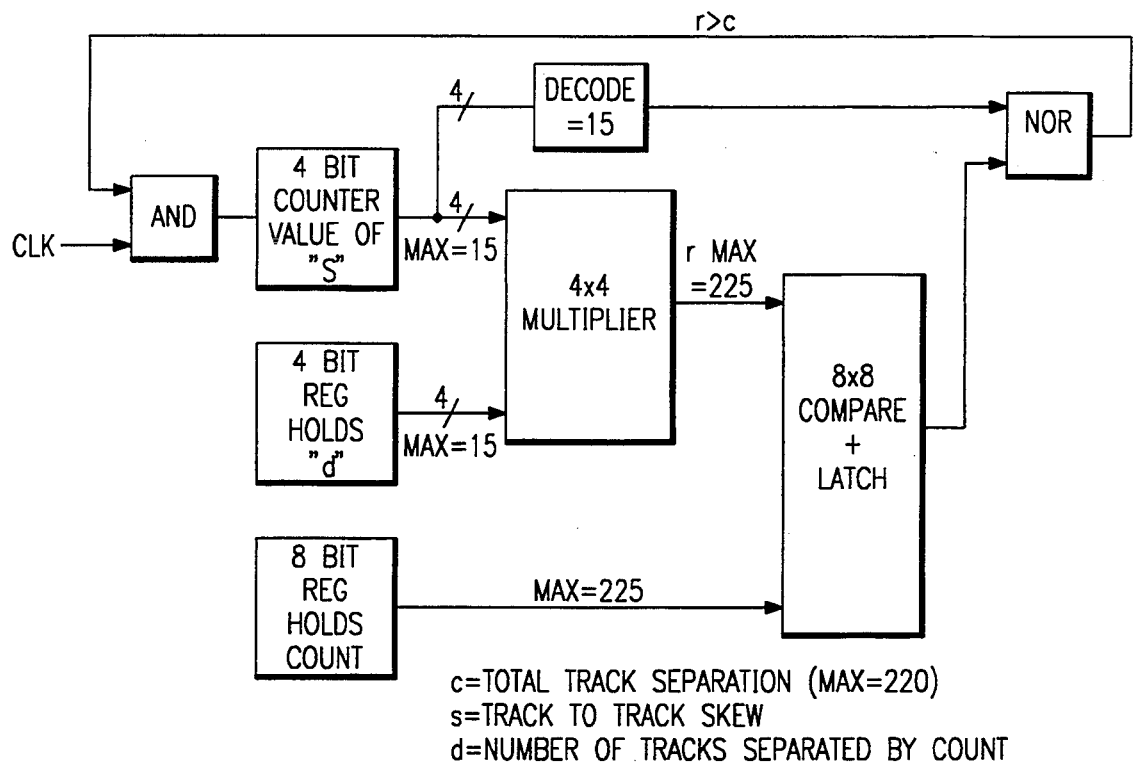
FIG. 7 illustrates the skew calculation divider circuit embodied in the present invention.

Turning now to FIG. 7, the circuit for accomplishing the track to track skew calculation is now described. The circuit primarily consists of a 4 bit counter, a 4×4 multiplier and an 8 bit comparator. Initially the counter is clocked as soon as the local state machine determines that the COUNT and d values are valid. Each time that the counter is incremented, the result of the multiplication (r) is compared with the COUNT value. When r exceeds the value of COUNT, the counter clock is degated and can no longer increment the counter. The value left in the counter is the track to track skew (s).

Since the track to track skew can not be greater than 15 in a 16 track implementation, only a 4 bit counter is required. Moreover, the longest calculation required would be only 15 clock cycles. The decoder is used to generate a clock degate signal in the event that the value of r never exceeds COUNT. The decoder generates an output when the four bits of the counter are at some value. The most likely value for the counter is 15. The comparator output is NORed with the decoder outputs to provide the clock degate signal. The multiplier and the rest of the circuitry is combinatorial thus generating only gate delays.

Figure 8:
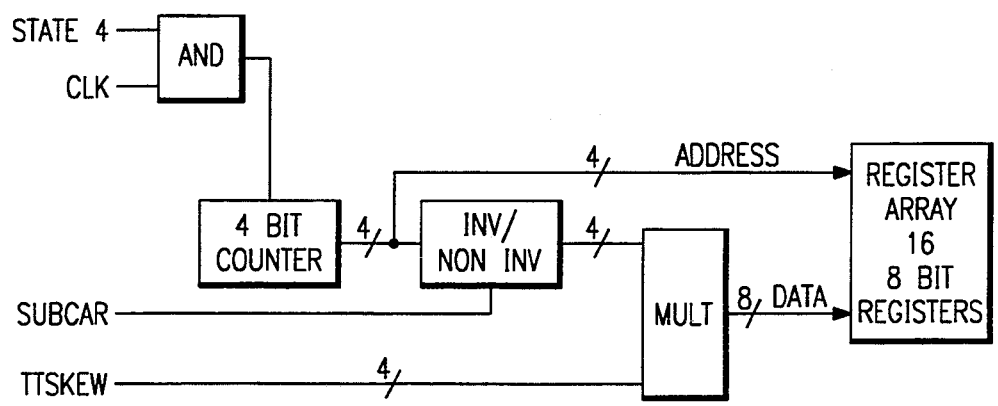
FIG. 8 is a block diagram showing the track count register array and its associated logic.

FIG. 8 illustrates the track compare COUNT register array and its associated circuitry. It is here that a COUNT for each register is stored for use in determining window locations for each track. As discussed above, window location determination is dependent upon a compare value for each track to compare against a reference in order to determine when to open the window for each track. The circuit in FIG. 8 implements the calculation of the reference values for each track and then loads the associated track register.

The variables input to the circuit of FIG. 8 are track to track skew (TTSKEW) and skew slope sign (SUBCAR). A four bit counter is used to provide one of the variables to be multiplied as well as the address to the track registers. Note that slope is defined such that track number 1 is at the top edge of the tape medium and track number 16 is at the bottom. At count 0, the first track register is addressed and the counter value times the TTSKEW is loaded into the first track register (addr=0000) if SUBCAR=1 representing a positive slope. If SUBCAR=0 (negative slope), then the complement of the counter value times the TTSKEW is loaded into the track register addressed by the counter value. The counter is then incremented to count 1 and the same procedure is used to load the next track register. Note that if SUBCAR=1, track 2 register (addr=0001) is loaded with counter value times TTSKEW and if SUBCAR=0, track 2 register is loaded with complement of counter value times TTSKEW. Operation continues in this manner until the counter reaches 1111.

The calculated track to track skew that was obtained for the first sync mark is latched and loaded into a microcode register. This value is available to microcode, after the block is processed, for use with the Error Recovery Procedures (ERPs).

The overall logic does not use a traditional skew (deskew) buffer in that the data are not deskewed at the very beginning. This is done for two reasons. First, the various marks have to be handled "in real time" in order to generate global resync window locations for the lost tracks. Second, there is already a large buffer (the de-interleaving buffer) that automatically deskews the data before sending it to the Error Correction circuitry.

In addition to synchronization considerations, multi-track tape devices present concerns over the use of Error Correction Code (ECC) circuitry and the alignment of the data tracks in general. Various problems arise because the data are spread out over the tracks and because there is a need to maintain track alignment in order to correctly process the data through the ECC circuitry. The buffering of data from tape into a data structure between the host 1 and the tape media is now described with reference to FIGS. 9, 10 and 11. It is in this data structure that ECC codes are added to the data to be written to tape.

During write operations in the tape device of this invention, device blocks are converted into ECC encoded physical blocks prior to transmission to the tape media. The device block is formed from an integral number of Minimum Interleave Units (MIUs), each of which is 8448 bytes in length in the preferred embodiment.

Figure 9:
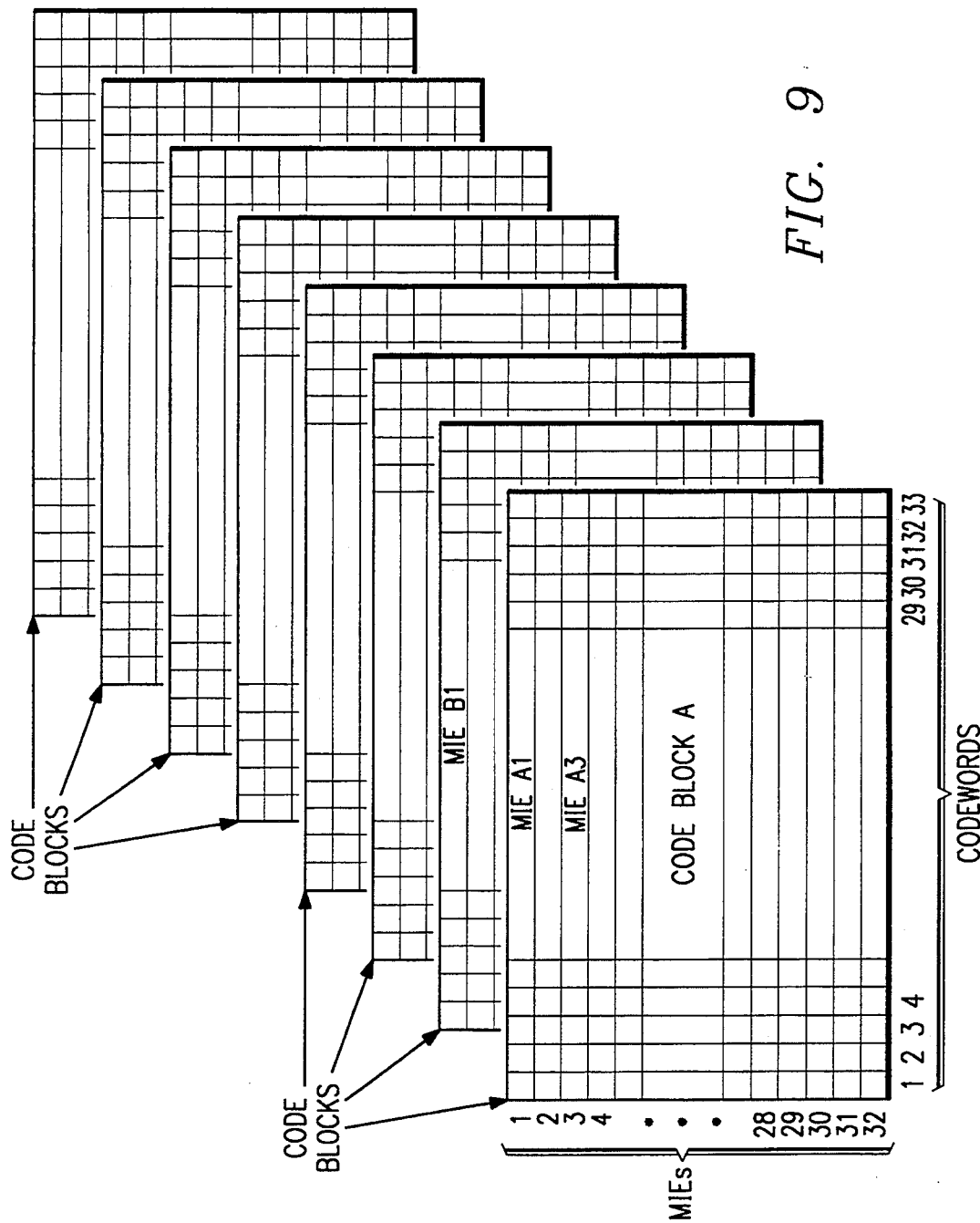
FIG. 9 is an illustration of the MIU structure used in the tape device of this invention.
Figures 10, 11:
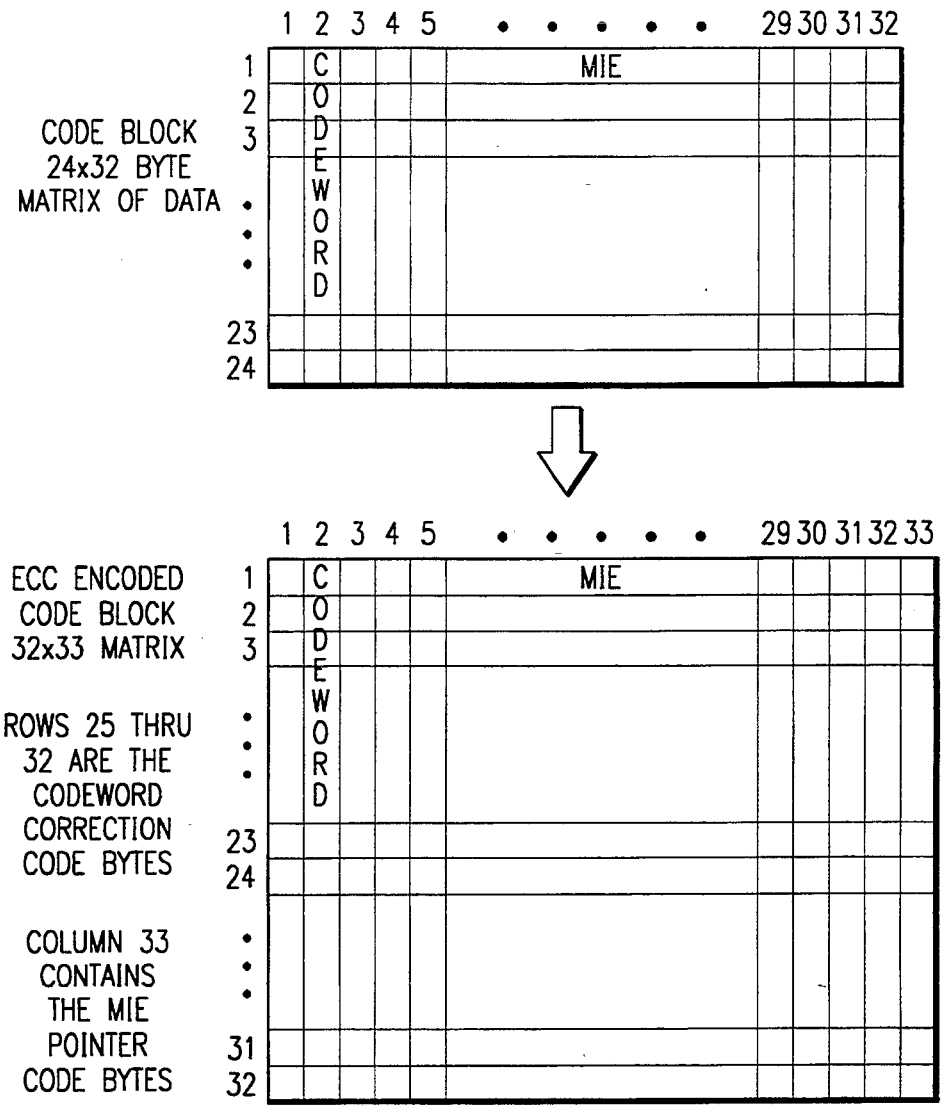
FIG. 10 is an illustration of the generation of ECC encoded code blocks used in the tape device of this invention.
FIG. 11 is an illustration of an MIE interleave representing the storage of code blocks in the interleave buffer in accordance with this invention.

Each MIU is created by the ECC circuitry which generates eight 1056 byte matrices which are termed code blocks and pictured in FIG. 9. The process for creating the code blocks in illustrated in FIG. 10. Each code block is consists of a matrix of 24×32 bytes of user data to which 256 ECC bytes are appended. In addition, an additional 32 bytes are added to the code block to provide error detection pointers. These pointer bytes are shown in FIG. 9 as the 33rd column of bytes. Finally, rows of the code blocks called MIEs are interleaved as shown in FIG. 11 to form the ECC encoded MIU.

It can be seen that the interleaving process is as follows. If each of the eight code blocks within an MIU is given an identifier of A through H, where code block A contains the first bytes of the MIU and code block H contains the last bytes of the MIU, then each MIE within an MIU can be identified by its code block identifier and code block row number. Each MIU will contain MIEs A1 through H32. These ECC encoded MIUs are concatenated to form the ECC encoded physical block which is written to tape.

The first MIE from ECC encoded code block A, (MIE A1) is placed first in the first row. The second MIE, which is placed in the second position in the 16 row matrix, is MIE B1. After the first MIE from each ECC encoded code block is placed in the first row, the second MIE from each ECC encoded code block is placed in the first row. Each of the 15 subsequent rows are generated in the same manner, except that each row begins with the subsequent ECC encoded code block (i.e. row 2 begins with MIE B3). By placing one MIE from each code block sequentially on a track and starting each track with an MIE from the subsequent code block, the impact of media related errors that cross multiple tracks or follow down one track will be minimized.

Later, during read operations, the ECC encoded physical blocks are converted to device blocks for transmission to the host 1. The MIUs are deinterleaved and each ECC encoded MIU is converted independently into an MIU by using the ECC bytes to detect and correct errors within the MIU. The ECC bytes are then discarded.

With an understanding of the buffering data structure in the tape system of this invention, additional data alignment techniques are now described. As will be seen, these realignment techniques are used at the modulation decoder input and in the deinterleaving buffer described above. The approach insures that individual tracks are kept in alignment and provides indications to the deinterleaving circuits (DIC) that a misalignment has been detected. Once a misalignment has been detected, addresses to data in the buffer can be shifted such that data are read out of the buffers as if the physical tracks were in perfect alignment without any track to track skew. It will be seen that in the system of this invention, lost tracks can be recovered using information from the good tracks to realign.

Logic that processes data when they are read from tape detects sync and resync marks embedded in the data to maintain and recover synchronization. Upon synchronization, the encoded data are read from tape, decoded, and are sent along with error pointers to the deinterleaving buffer for processing by the DIC. If an individual track can not be realigned through a series of resync marks on the local level, then it must be realigned at the sync mark after the next occurring resync burst.

As described above, the track logic maintains local counters to record and control the occurrence and size of the resync windows in which a resync mark must be detected. If a resync mark is detected within the local resync window but is not at the expected location, a RESTART signal is sent to the DIC to signal the need for realignment by address manipulation in the interleave buffer. If the resync mark does not occur at all in the window, the track logic attempts to reestablish synchronization at the next resync mark. At the time that it is determined that the resync mark is missed, a RESTART is not issued because it can not be determined whether the sync mark was corrupted or whether a large bit slip moved the mark outside of the window.

Because the local track circuitry is aware only of information coming from the local track clock, it is not able to determine whether the next resync mark will occur within its window. For this reason, after a resync mark is missed entirely, the next resync is located, if at all, through a global resync window. This global resync window is controlled by circuitry which was described above. This circuitry uses the previously calculated track to track skew to generate a global resync window. The window generated by the global resync circuitry spans the probable location of the resync marks for all of the tracks.

Figure 12:
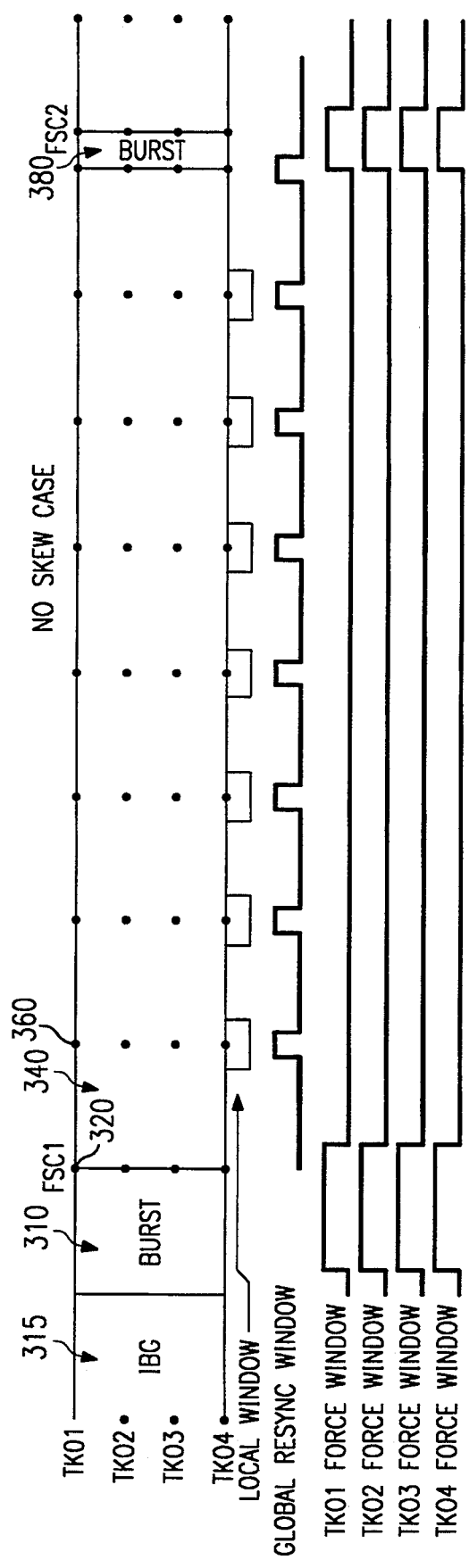
FIG. 12 is a diagram illustrating the use of local and global resync windows in the absence of skew in accordance with the teachings of this invention.

Turning now to FIG. 12, the specific implementation of the data alignment method using both global and local windows is now described. FIG. 12 illustrates a situation where there is no skew present in the system. For purposes of this discussion, the figure shows only four tracks on the tape medium. It should be understood, however, that the procedure described could apply to any number of tracks and, in fact, applies to sixteen tracks in the preferred embodiment. Force windows for each of the tracks are shown. They are sized by the process described above and occur only with respect to the FSCs (e.g. 320) which follow acquisition bursts and resync bursts. FIG. 12 further shows both the local and global resync windows for detection of the resync characters located between burst regions.

When the first FRC 360 is encountered following the burst, the local window will be used to detect the sync mark. The local window is a fixed size and corresponds simply to the expected distance between FRC marks 360. If the local window does not detect the first FRC 360, the global window will be used at the next FRC mark 360. When the track uses the global resync window to detect the FRC 360, it still keeps its local counters for the local window in operation. If the FRC 360 is then detected within the global resync window but not at the point where it is expected, a RESTART is issued and the track uses its local resync window to detect the next FRC 360. If the FRC 360 is detected where it is expected, the track does not issue a RESTART and goes back to using its own local resync window. If the FRC 360 can not be located at all within the global resync window, then the track uses the global window again at the next resync mark.

Figure 13:
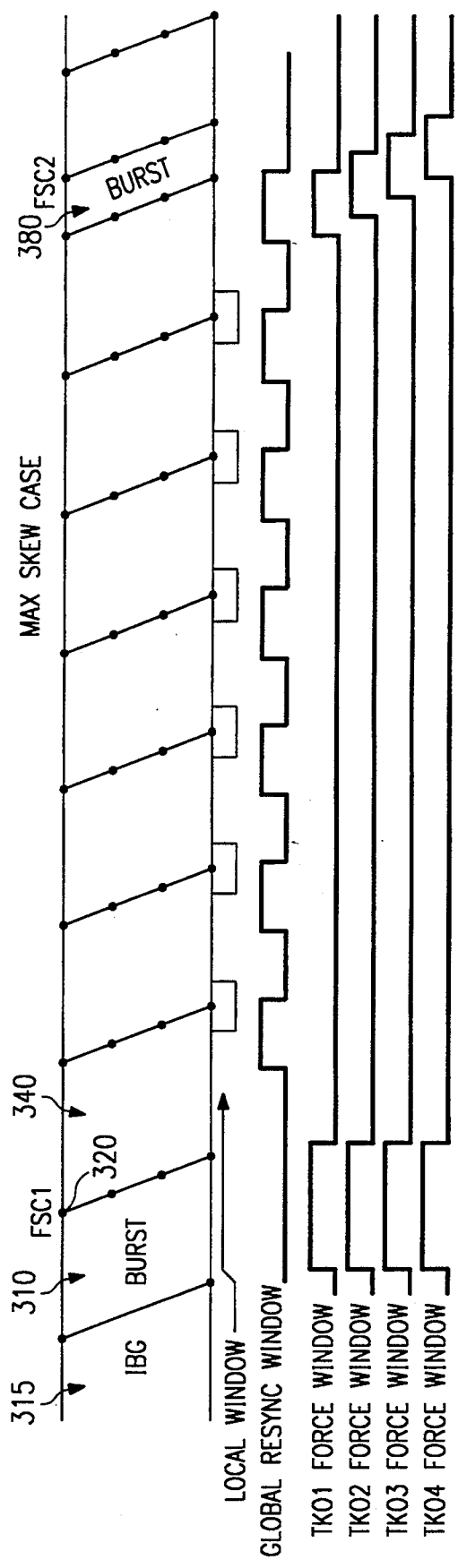
FIG. 13 is a diagram illustrating the use of local and global resync windows in the presence of skew in accordance with the teachings of this invention.

FIG. 13 illustrates the same procedure, only in a situation where there is a significant amount of skew introduced in the tape system. It should be noted that as the amount of skew in the system increases, so do the size of global resync windows. By increasing the size of the global resync window where skew exists, the possibility for reacquiring a single track using the global window increases. Once this occurs, the track can return to its associated local window.

The data alignment function which makes use of the track force windows can be performed in one of three modes. These modes are programmable and may be altered automatically by the tape system as conditions change. A discussion of the three modes follows: First, the track can continue using its local counters to maintain synchronization. This mode is termed "normal mode". In no case does the track seek global window help to reacquire synchronization. This mode is most efficient while the tape device is performing a Read While Write (RWW) operation (when the tape is written and read verified on the same pass). If the tape is not being written properly, the individual tracks may have trouble synchronizing and there will be an indication that the tape is not being written properly.

A second mode is the "alignment mode". In this case, if the track misses the 7th resync (e.g. 440 in FIG. 3) in the interval between bursts the track needs resynchronization and will attempt to resynchronize using a wider global force window. Although this window is created globally, it is tailored to each track and its location is based upon the calculated skew. If the track misses the sync mark within the force window, it starts reading data anyway and attempts to reestablish synchronization at the next resync using the global resync window. This mode of operation is the default mode in the preferred embodiment. This mode of operation provides the most robust method of data recovery.

The final mode is called "acquisition mode". This mode of operation is the same as alignment mode with one difference. Each individual track that attempts to reacquire synchronization also issues a PLL ACQUIRE signal to the clock circuits. The PLL ACQUIRE signal can only be activated as the read head passes a burst region. This mode is used in cooperation with error recovery procedures or if the alignment mode is unable to recover data. In this mode, it is assumed that the failure to recover data was due to loss of lock on the track Phase Locked Loop (PLL). By attempting to relock the PLL, the track should be able to resynchronize so that the data can be recovered.

Also during the reading of the burst region, the circuits that view the tracks globally issue an ADDRESS CHECK pulse for each track. The pulses are adjusted for skew and they occur at a time when the address for each track should be at a specific point. The DIC uses this indicator to perform major adjustments to the individual memory address locations as shown in FIG. 11. The operation of the deinterleaving buffer circuits is now described.

The deinterleaving buffer, as mentioned above, stores an entire MIU of data prior to sending the data for ECC processing. The DIC, associated with the deinterleaving buffer, processes data bytes in the order that they are read from tape for each track, but stores them in the buffer addresses that they had prior to being interleaved during the write process. This allows the MIU buffer to be unloaded to the ECC circuits with the bytes in their original order prior to interleaving.

When the DIC receives a RESTART signal from the individual track logic, it checks to see if it has already received more or less than half of the expected bytes for the resync interval. If it has received less than half of the expected bytes, it assumes that the particular track was ahead of where it should have been and it adjusts the buffer address for that track back to the start of the current resync interval. Any data bytes that had already been written to the deinterleaving buffer for that track's resync interval are considered invalid because they were intended for the previous resync interval. They are subsequently overwritten by future data bytes. The track logic additionally sends a pointer byte with the RESTART signal, which in this case indicates that some data from the previous resync interval were in error.

If more than half of the expected bytes have been received, the DIC assumes that the particular track was behind where it should have been and it adjusts the buffer address for that track to the start of the next resync interval. Thus it can be seen that some of the buffer locations for the current resync interval may not actually get written and those buffer locations will contain unknown data. The pointer byte sent with the RESTART signal indicates that some data for the current resync interval are in error. If the buffer address for that track is already at a resync interval boundary then no adjustment is made.

The DIC receives an ADDRESS CHECK signal from the track logic once every 8 resync intervals. If the DIC has received less than 4 complete resync intervals for that track, it adjusts the buffer address for that track back to the previous ADDRESS CHECK boundary. If the DIC has received 4 or more complete resync intervals for that track, it adjusts the buffer address for that track forward to the next ADDRESS CHECK boundary. If that track's buffer address is already at an ADDRESS CHECK boundary, no adjustment is made. It is thus possible, in the second case, that the data for one or more resync intervals and their associated pointers will never get written.

If the DIC has to make a forward ADDRESS CHECK adjustment, some resync intervals will get skipped. Further, the associated pointers, which should indicate that the data is invalid, will not get written. It is important, therefore, for the DIC to preset all of the pointers at the beginning of an MIU to indicate that all of the data for the current MIU is initially invalid. Then, as the data from the track logic is received, the pointers are rewritten with their true values to indicate the status of their associated data. The DIC does this by utilizing spare memory cycles, when no data are received from the track logic, to preset the pointers for the current ADDRESS CHECK interval for the particular track.

The pointers are preset in the same order that they would normally be received from the track logic. The DIC always has enough spare memory cycles to preset all of the pointers for an ADDRESS CHECK interval before the midpoint of that interval is reached. In typical operation, there are enough spare memory cycles while the tape is passing through a burst region to preset all of the pointers for the next burst interval. It is also possible, however, for the DIC to multiplex the presetting of the pointers while it is writing the data bytes for the first portion of a burst interval by using spare memory cycles if it becomes necessary.

It can thus be seen that the method and apparatus of the above described invention provides a mechanism for measuring and handling large amounts of skew not present in previous tape drives. The method and apparatus uses a local window during normal operation when no major synchronization problems exist, and switches to a global window when the local window is incapable of maintaining synchronization. The RESTART method of adjusting interleave buffer addresses allows the use of large resync windows so that large bit slip conditions can be handled.

While the invention has been shown and described with reference to a preferred embodiment, it will be understood by those skilled in the art that various changes in form and details may be made therein without departing from the spirit and scope of the invention.

What is claimed is:

1. A method for indicating when all of the tracks in a multitrack tape device susceptible to track skew, are in burst, said method comprising the steps of:
   achieving a successful burst vote when at least a predetermined portion of said tracks detect a burst;
   starting a first counter;
   determining a slope of said track skew;
   calculating a track multiplier;
   multiplying said track multiplier by a predetermined maximum expected skew to provide a first compare value; and
   issuing a signal indicating that each of said tracks are in burst when said first counter exceeds said compare value.

2. The method of claim 1 wherein said track multiplier is calculated such that if the slope of said track skew is positive, the value 1 is subtracted from a track identification value of the last track detecting burst and if said track skew is negative, the said track identification value of the last track detecting burst is subtracted from the number of tracks being concurrently read.

3. The method of claim 2 wherein the number of tracks being concurrently read is sixteen.

4. The method according to claim 1 wherein said successful burst vote is achieved when at least ¾ or more of said tracks detect a burst.

5. A multitrack tape apparatus for reading and writing to a tape medium comprising:
   a magnetic head;
   drive control for transporting said tape medium over said magnetic head;
   means for determining whether a successful burst vote has been achieved, said successful burst vote being achieved when at least a predetermined portion of said tracks detect a burst;
   means for starting a first counter;
   means for determining a slope of said track skew;
   means for calculating a track multiplier;
   means for multiplying said track multiplier by a predetermined maximum expected skew to provide a first compare value; and
   means for issuing a signal indicating that each of said tracks are in burst when said first counter exceeds said compare value.

6. The multitrack tape apparatus according to claim 5 wherein said successful burst vote is achieved when at least ¾ or more of said tracks detect a burst.

* * * * *